(12) United States Patent
Hernandez et al.

(10) Patent No.: US 7,491,756 B2
(45) Date of Patent: Feb. 17, 2009

(54) WATER-BASED ASPHALT COATING COMPOSITION

(75) Inventors: Pamela Hernandez, Medina, OH (US); Stephen Robert Peters, Mentor, OH (US)

(73) Assignee: TREMCO Incorporated, Beachwood, OH (US)

( * ) Notice: Subject to any disclaimer, the term of this patent is extended or adjusted under 35 U.S.C. 154(b) by 692 days.

(21) Appl. No.: 11/228,823

(22) Filed: Sep. 16, 2005

(65) Prior Publication Data

US 2006/0276559 A1    Dec. 7, 2006

Related U.S. Application Data

(60) Provisional application No. 60/610,651, filed on Sep. 16, 2004.

(51) Int. Cl.
  *C09D 195/00* (2006.01)
(52) U.S. Cl. .......................................... 524/60; 524/61
(58) Field of Classification Search .................. 524/60, 524/61
  See application file for complete search history.

(56) References Cited

U.S. PATENT DOCUMENTS

| | | | |
|---|---|---|---|
| 3,085,889 A * | 4/1963 | Swift ........................ 106/219 |
| 3,179,610 A | 4/1965 | Wood | |
| 3,835,077 A | 9/1974 | Mori et al. | |
| 4,724,245 A * | 2/1988 | Lalanne et al. ................ 524/61 |
| 4,812,493 A * | 3/1989 | Cummings .................. 523/412 |
| 4,892,891 A | 1/1990 | Close | |
| 5,274,014 A * | 12/1993 | Silverton .................... 524/60 |
| 5,319,008 A | 6/1994 | Janoski | |
| 5,364,894 A | 11/1994 | Portfolio et al. | |
| 5,421,876 A | 6/1995 | Janoski | |
| 5,539,029 A | 7/1996 | Burris | |
| 5,811,477 A * | 9/1998 | Burris et al. ................... 524/60 |
| 5,925,695 A | 7/1999 | Ohtsuka et al. | |
| 5,981,010 A | 11/1999 | Terry et al. | |
| 6,538,060 B2 | 3/2003 | Rajalingam et al. | |
| 6,706,787 B1 | 3/2004 | Burris et al. | |

OTHER PUBLICATIONS

International Search Report dated Apr. 7, 2006.

* cited by examiner

*Primary Examiner*—David M Brunsman
(74) *Attorney, Agent, or Firm*—Calfee, Halter & Griswold LLP

(57) ABSTRACT

The present invention relates to multi-part coating compositions that comprise a first part which is an asphalt emulsion comprising water, asphalt, and a dispersion system and a second part which is a liquid polymer composition that lacks water. The asphalt emulsion and liquid polymer composition are combined in situ to provide a coating that has fast dry characteristics, and that quickly develops good water-resistance. Such compositions are useful as coatings on metal, wood, and other surfaces, where fast drying characteristics are important. Such compositions are particularly useful as coatings on substrates where early water-resistance of the coating is important, such as those surfaces which are routinely exposed to the outdoors.

22 Claims, No Drawings

WATER-BASED ASPHALT COATING COMPOSITION

CROSS-REFERENCE TO RELATED APPLICATIONS

This application claims the benefit of U.S. Provisional Application 60/610,651 filed Sep. 16, 2004.

BACKGROUND OF THE INVENTION

Asphalt is inexpensive, has a relatively high penetration value when applied to most porous surfaces, and is relatively weather-resistant and water-impermeable. As a result, asphalt has traditionally been used as a major component of protective coatings, films, and membranes. Water-based asphalt emulsions has been used for a wide array of products including waterproofing membranes, paving and roofing products, joint sealants, specialty paints, electrical laminates and hot melt adhesives. In addition, water-based asphalt emulsions have been used as diluents in the manufacture of low-grade rubber products, as diluents for the disposal of radioactive waste, for hot-dip coatings, and for water-retention barriers. For many of these applications, the water based asphalt emulsion is modified by inclusion of a hydrocarbon polymer such as natural rubber. The coating that results when such a modified product is applied to a substrate and allowed to dry has improved performance properties.

Asphalt emulsions, in their most basic form, are made by melting solid asphalt, typically at a temperature between 210-300° F., and then mixing the molten asphalt with water and a dispersant system. Such mixing, typically, is done in a colloid mill under high shear and high speed. If the emulsion is to be used as a waterproofing coating, hydrocarbon polymer emulsions/latexes such as natural rubber, styrene butadiene rubber (SBR), acrylic, etc., typically, are then added to these emulsions to give the properties that are desired. Since the resulting blend (asphalt emulsion plus hydrocarbon polymer emulsion/latex) typically requires an alkaline stabilizer such as ammonium hydroxide, the coating compositions are often neutral to alkaline in nature. Although, it is also possible to add the desired hydrocarbon polymer emulsion to the asphalt emulsion in situ, this is more difficult and rarely done.

Water-based asphalt emulsions, including those that comprise a hydrocarbon polymer emulsion or suspension such as a rubber latex, cure through moisture evaporation and subsequent coalescence of the dispersed particles. Even though these materials skin over in a relatively short period of time, the skin, generally, is not tough enough to withstand contact with water as in rainfall for exterior applications. Rain erodes the skin and washes out the uncured material underneath. Accordingly, application instructions for such materials generally suggest not applying the emulsion to a substrate if rain is a possibility within several hours of application. Moreover, the time required to cure through the entire coating composition may be unacceptably long or not occur at all. Such difficulties limit the thickness of the asphalt based coating compositions that can be applied to the underlying substrate. Because of the long drying time, the standard practice in the industry is to add a salt, such as calcium chloride during application to "break" the emulsions. The salt reacts with the ionic groups in the emulsion, causing the emulsion to destabilize and coagulate faster.

Non-water-based weather resistant coatings may also be prepared by combining polyurethane extenders and isocyanates to an asphalt material. However, the blend has to be heated, generally, from 80° C. to 120° C. Such methods are cumbersome and require special equipment on the job site.

Accordingly, it is desirable to have new systems and methods for preparing water based asphalt-containing coatings, films, and membranes Methods and systems that provide water-based asphalt coating compositions that dry more quickly, and thus achieve more rapid wash out resistance are desirable. Methods and systems that provide water-based asphalt-containing coating compositions with a relatively rapid cure through are also desirable. A rapid cure through of the coating compositions allows for reduced time on a job site, weight bearing loads sooner, pedestrian traffic sooner without detrimental effects to the physical integrity of the coating. In addition, a rapid cure through also enables a thicker layer of the coating composition to be applied as a single (i.e., in one step) as opposed to multiple layers to achieve the same thickness.

SUMMARY OF THE INVENTION

The present invention provides systems and methods for preparing a water-based, asphalt-containing coating, membrane, or film. The system comprises a first composition (referred to hereinafter as "Part A") and a second composition (referred to hereinafter as "Part B") for producing a water-based asphalt coating composition that can be applied to a vertical or horizontal substrate and cured relatively quickly without application of heat. The first composition of the system is an emulsion comprising asphalt, water and a dispersant system. The asphalt emulsion may further comprise other emulsions of organic polymers such as natural rubber, styrene-butadiene rubber, acrylic resins, polyvinyl acetate, and similar materials, or any combinations thereof. These organic polymers are added to the asphalt emulsion to provide desired performance properties, including strength, adhesion, elasticity, and/or water vapor permeance. In certain embodiments, the solids ratio of the asphalt emulsion is from 35 to 65%. The second composition (Part B) is a viscous liquid that can be blended with Part A. Part B comprises a non-emulsion, liquid polymer composition that lacks water. The system is based, at least in part, on inventors' discovery that the addition of a relatively small amount of such a liquid polymer composition to a water-based asphalt emulsion in situ produces a coating composition that dries more quickly than water-based asphalt emulsions to which such a liquid polymer composition has not been added. As a result, such coatings have increased wash-out resistance. Inventors have also discovered that addition of a relatively small amount of such a liquid polymer composition to a water-based asphalt emulsion in situ provides a coating with faster cure through. Thus, when the present system is used a thicker layer of such coating can be applied to a substrate.

The present invention also relates to methods of coating a substrate by combining Part A of the present system with Part B of the present system, and applying the resulting emulsion or blend to the substrate. The present system can be used to coat a variety of substrates including, but not limited to concrete, wood, or metal. The resulting emulsion or blend can be applied to the substrate by spraying, dipping, rolling, painting, or spreading. Depending upon the solids content and the amount and type of hydrocarbon polymer emulsion in Part A, Part A and Part B are combined at ratio of from 3:1 or greater, preferably at a ratio of 17:1 to 3:1 The ratio is adjusted based on the desired skin and cure-through time. The method can be used to form a coating of varying thicknesses, including, but not limited to, a single layer coating that is more than 250 mils, on a substrate.

DETAILED DESCRIPTION OF THE INVENTION

The present invention will now be described with occasional reference to the specific embodiments of the invention. This invention can, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Provided herein is a system for producing a weather-resistant coating or membrane with a fast cure-through rate. The system comprises a water-based asphalt emulsion system (Part A) and a liquid polymer composition that lacks water (Part B) for forming a waterproofing coating, and methods of making such coating by combining Part A and Part B of the present system. Part A of the composition may further comprise a hydrocarbon polymer emulsion such as a natural rubber, styrene-butadiene rubber, acrylic resin, polyvinyl acetate, and similar materials or any combinations thereof. In certain embodiments, the ratio of Part A to Part B in the system ranges from 17:1 to 3:1. Thus, depending upon the solids content and the amount and type of hydrocarbon polymer emulsion in Part A, or the pH of the emulsion system of Part A, the ratio of Part A to Part B in the system can be 17:1, 16:1, 15:1, 14:1, 13:1, 12:1, 11:1, 10:1, 9:1, 8:1, 7:1, 6:1, 5:1, 4:1, 3:1 15:2, 13:2, 11:2, 9:2, 7:2, etc. Optimum ratios can be determined by the skilled artisan using standard techniques.

Part A

Water-Based Asphalt Emulsion

Part A of the present system is an emulsion comprising water, asphalt, and a dispersion system. The asphalt may be a polymer-modified asphalt, an oxidized asphalt, or an unoxidized asphalt. The asphalt emulsion may further comprise a hydrocarbon polymer emulsion/latex such as a natural rubber, a synthetic rubber like styrene butadiene, an acrylic resin, polyvinyl acetate, and similar materials, or any combinations thereof. One example of a suitable synthetic polymer emulsion is a styrene-butadiene rubber (SBR) emulsion. The SBR may also be cross-linked, for example, with carboxylate groups resulting from treatment with methacrylic acid, or the like. Another example of a suitable synthetic polymer emulsion is a polyacrylate emulsion. Polymer emulsions may be made prior to mixing, or polymerized in the asphalt during the emulsification process.

The dispersion system comprises one or more asphalt emulsifiers. The asphalt emulsifier can be nonionic, anionic, or cationic. Examples of nonionic emulsifiers are mono- and di-glycerides, polysorbates, and glycerol esters. Examples of anionic emulsifiers are soaps, sulfated oils, and sulfated alcohols. Cationic emulsifiers are typically some type of amine compound.

The asphalt emulsion may further comprise other optional ingredients such as defoamers, rheology modifiers, fillers, antifreeze agents, plasticizers, cross-linkers, solvents etc.

Part B

Part B of the present multi-part system is a liquid polymer composition that lacks water. Such composition is liquid at room temperature and has a viscosity that allows part B to be mixed with part A to provide a coating composition that can be applied to the surface of a substrate by spraying or pouring. Thus, in certain embodiments, Part B has a viscosity of between 3000 and 60,000 cps. In certain embodiments, Part B comprises an organic solvent. In other embodiments, Part B lacks an organic solvent, i.e., is solventless.

Liquid Polymer

Part B of the present system can comprise one or more of the following non-emulsion, liquid polymers: polyurethane polymers, acrylic polymers, sytrene butadiene, styrene block polymers, including but not limited to, styrene (ethylene-butylene)-styrene (SEBS) block polymer, styrene-(isoprene)-styrene (SIS) block polymer, styrene-(butylene)-styrene (SBS) block polymer, styrene-(ethylene-propylene)-styrene (SEPS) block polymer, and styrene-(ethylene-propylene) (SEP) block polymer, silicone polymers, i.e. organopolysiloxanes, or any combinations thereof.

The polyurethane polymer is formed by reacting a hydroxy-terminated polymeric material with an aromatic or an aliphatic isocyanate to provide a polyurethane polymer. The polyurethane polymer may comprise uncapped or end-capped NCO groups or both. In certain embodiments, the polyurethane polymer composition comprises from about 1.2 to 3.5% by weight of NCO groups.

Suitable hydroxy-terminated polymeric materials for preparing the present polyurethane polymer include, but are not limited to di, tri, and tetra functional polyols, including polyether polyols, polyester polyols, acrylic polyols, and polyols comprising two or more hydroxyl groups and a straight or branched chain hydrocarbon.

Suitable polyether diols and triols include polyethylene ether diols or triols, polypropylene ether diols or triols, polybutylene ether diols or triols, polytetramethylene ether diols or triols, and block copolymers of such diols and triols.

Suitable hydroxy-terminated polyesters include any hydroxy-terminated polyester prepared from poly-basic acids or anhydrides (for example, adipic acid and phthalic anhydride). Polylactone containing hydroxyl groups are also suitable for making the polymer, particularly polycaprolactone diol and triol.

Suitable acrylic polyols include hydroxyl-terminated polyacrylate. Acrylates include, but are not limited to, butylacrylate, methylacrylate, methylmethacrylate, ethyl acrylate, 2-ethylhexyl acrylate or the mixture of above. Suitable polyols comprising two or more hydroxyl groups and a straight or branched hydrocarbon chain include hydroxyl functionalized polybutadiene. Other suitable polyols include polycarbonates having hydroxyl groups.

In certain embodiments, the polyol has a weight average molecular weight of from 500 to 18,000.

The isocyanates that are reacted with the hydroxy-terminated backbone polymer are organic isocyanates having 2 or more isocyanate groups or a mixture of such organic isocyanates. The isocyanates are aromatic or aliphatic isocyanates. Examples of suitable aromatic di- or triisocyanates include p,p',p"-triisocyanato triphenyl methane, p,p'-diisocyanato diphenyl methane, naphthalene-1,5-diisocyanate, 2,4-tolylene diisocyanate, 2,6-tolylene diisocyanate, and mixtures thereof. Examples of preferred aliphatic isocyantes are isophorone diisocyanate, dicyclohexyl methane-4,4'-diisocyanate, and mixtures thereof.

The polyurethane polymer may be prepared by mixing the hydroxy-terminated polymer and organic isocyanate together at ambient temperature and pressure, although the speed of the reaction is significantly increased if the temperature of the reaction mixture is raised to a higher temperature, for example, a temperature between 60°-100° C. A molar excess of the isocyanate is used to ensure that the substantially all the polyurethane prepolymer chains have NCO terminal groups. A catalyst such as a tin catalyst may be added to the mixture to accelerate formation of the polymer.

In certain embodiments, the % by weight of NCO groups on the polyurethane polymer ranges from 1.9 up to 3.0.

Part B may comprise polyurethane polymers that are uncapped or end-capped or combinations thereof. The end capped polyurethane polymers may be end-capped with silane capping agents, alcohol end capping agents, or epoxies Examples of suitable silane capping agents include, but are not limited to, silanes corresponding to the formula I.

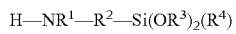

$$H-NR^1-R^2-Si(OR^3)_2(R^4) \qquad I$$

wherein $R^1$ represents hydrogen, a substituted aliphatic, cycloaliphatic, and/or aromatic hydrocarbon radical containing 1 to 10 carbon atoms, a second —$R^2$—Si $(OR^3)_2(R^4)$, or —$CHR^5$—$CHR^6COOR^7$ where $R^5$ and $R^6$ are H or $C_{1-6}$ organic moiety, and $R^7$ is $C_{1-10}$ organic moiety.

$R^2$ represents a linear or branched alkylene radical containing 1 to 8 carbon atoms.

$R^3$ represents a $C_{1-6}$ alkyl group.

$R^4$=—$CH_3$, —$CH_2CH_3$, or $OR^3$.

Examples of suitable aminosilanes corresponding to formula I include N-phenylaminopropyltrimethoxysilane, N-ethylaminoisobutyltrimethoxysilane, gamma-aminopropyltrimethoxysilane, gamma-aminopropyltriethoxysilane, and the reaction product of an aminosilane (such as gamma-aminopropyltrimethoxysilane, gamma-aminopropyltriethoxysilane, gamma-aminopropylmethyldimethoxysilane) with an acrylaic monomer (such as ethyl acrylate, butyl acrylate, 2-ethylhexyl acrylate, methyl acrylate, methyl methacrylate, and glycidal acrylate).

Examples of other suitable silanes include mercaptosilane, the reaction product of a mercaptosilane with a monoepoxide, and the reaction product of an epoxysilane with a secondary amine.

The silicone polymer or organopolysiloxane used in the present composition may be a non-reactive organopolysiloxane, i.e., a polysiloxane that contains no reactive functional groups. In other embodiments, the organopolysiloxane is a reactive organopolysiloxane that contains reactive functional groups, preferably two reactive functional groups on the polymer chain, preferably at the terminal portion thereof, i.e., preferably the reactive functional groups are end-groups. Organopolysiloxanes useful in this invention include, but are not limited to, those which contain a condensable functional group which can be an hydroxyl group, or hydrolyzable group such as a silicon-bonded alkoxy group, acyloxy group, ketoximo group, amino group, amido group, aminoxy group, an alkenoxy group, and so forth. The reactive functional groups may be hydroxyl, alkoxy, silicone alkoxy, acyloxy, ketoximo, amino, amido, aminoxy, alkenoxy, alkenyl, or enoxy groups or any combination thereof. The reactive functional groups are end groups, pendant groups, or a combination thereof. In certain embodiments, the organopolysiloxanes used in the present invention preferably have a molecular weight in the range from 20,000 to 100,000 grams/mole.

In one embodiment, the reactive organopolysiloxane polymer is of the formula:

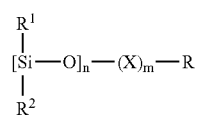

where $R^1$ and $R^2$, independently, are an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the organopolysiloxane is from about 10,000 to about 200,000 and desirably from about 20,000 to about 100,000 grams/mole. It is to be understood that the above polymers also contain, as noted above, two or more reactive functional groups (X) therein. The functional groups, independently, can be OH, or $OR^3$, or $N(R^4)_2$, enoxy, acyloxy, oximo, or aminoxy, wherein these functional groups may have substituents at any substitutable location. For example,

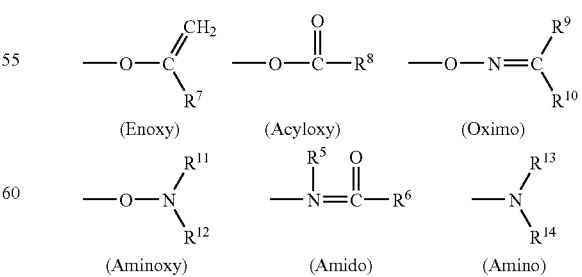

wherein $R^3$ through $R^{14}$ are, independently, an alkyl or cycloalkyl having from about 1 to about 8 carbon atoms.

In one embodiment, the reactive organopolysiloxane of the present polymer composition may be depicted as

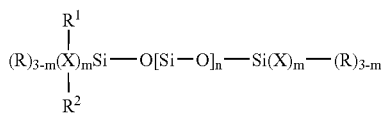

The one or more R groups, independently, is an alkyl having from 1 to 8 carbon atoms or an aromatic or an alkyl-aromatic having from 6 to 20 carbon atoms and optionally containing one or more functional groups thereon, such as amine, hydroxyl, alkene, alkoxy, and so forth. The amount of the functional groups, i.e., m, is 1, 2 or 3.

The reactive functional group (X), can be OH, or OR', or N(R'), or enoxy, or acyloxy, or oximo, or aminoxy, or amido, wherein the reactive functional group may have substitutions, R', at any substitutable C or N, and which is selected from the group consisting of an alkyl having from about 1 to about 8 carbon atoms, an aromatic, an alkyl-aromatic having from 6 to 20 carbon atoms, and wherein R' may optionally contain one or more functional groups thereon such as amine, hydroxyl, and so forth. An organopolysiloxane fluid can furthermore contain a blend of two or more different polysiloxanes and/or organopolysiloxanes having different molecular weights. The polysiloxanes are generally a viscous liquid and are commercially available from several silicone manufacturers such as Wacker Corporation, General Electric, Dow Corning and Rhone-Poulenc.

In another embodiment, the present polymer composition comprises a non-reactive organopolysiloxane, i.e., the organopolysiloxane lacks functional groups. The non-reactive organopolysiloxane may be depicted as

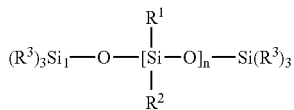

where $R^1$, $R^2$, and $R^3$ independently, are an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the organopolysiloxane is from about 100 to about 100,000 and desirably from about 3,000 to about 50,000 grams/mole.

Optional Ingredients

Optionally, part B of the present system comprises a plasticizer, which may be used to control or reduce the viscosity of Part B. Examples of suitable plasticizers for use in part B include, but are not limited to phthalates, benzoate esters, and mineral oil. Part B may also comprise fillers such as calcium oxide, calcium carbonate, fume silica, clay, talc. Such fillers may be added to control the viscosity, rheology, or reduce cost of Part B. Optionally, Part B comprises one or more of, a moisture scavenger and a UV stabilizer.

Solvent

In certain embodiments, Part B of the present invention does not include a solvent, i.e., the polymer composition is solventless. In other embodiments, Part B comprises a solvent, which may be used for solubilizing the polyurethane polymers. Examples of suitable solvents for use in the present system include but are not limited to, mineral spirits, xylene, and toluene.

Preparation of the Polyurethane Asphalt Coating.

Depending upon the type of coating that is desired, various ratios of part A may be combined with Part B, to provide the water-based asphalt-containing coating composition of the present invention. In certain embodiments, the ratio of part A to part B ranges from 17:1 to 3:1 parts by weight. The ratio selected depends, at least in part, on the solids content of the asphalt emulsion, the absence or presence of additional ingredients such as natural rubber, styrene butadiene, acrylic or PVA emulsions or combinations thereof in the asphalt emulsion. Part A is combined with Part B at ambient temperature and the resulting emulsion or blend applied to one or more horizontal or vertical surfaces of an underlying substrate. Thereafter, the resulting emulsion or blend is allowed to cure or dry under ambient conditions. When such conditions include temperatures of 50° F. or less, it may be desirable to add a curing catalyst to the resulting emulsion or blend before application. Examples of suitable curing catalysts include dibutyltin diacetate, dibutyltin dilaurate, and dibutyltin bis (acetylacetonate). The catalyst may also be pre-added to Part A, i.e., the asphalt emulsion.

The present method does not require heating of any part of the present multi part system, and therefore overcomes some of the disadvantages of the previous methods that have been used to make polyurethane asphalt coatings.

Properties of Coating

The coatings that are produced in accordance with the present method have increased wash out resistance as compared to coatings that result from applying Part A alone to an underlying substrate. In addition, the coatings that are produced in accordance with the present method cure more rapidly that coatings that result from applying Part A alone to an underlying substrate. Thus, in certain embodiments, the present method can be used to make a single layer coating that is thicker than a single layer coating that results from applying Part A alone to an underlying substrate.

EXAMPLES

The following examples are for purposes of illustration only and are not intended to limit the scope of the claims which are appended hereto. All references cited herein are specifically incorporated in their entirety herein.

Materials

Part A: Asphalt Emulsion

Asphalt emulsion (~50% solids) or a polymer modified asphalt emulsion such as an SBR-asphalt emulsion (~60% solids), natural rubber-asphalt emulsions, or acrylic-asphalt emulsions are available from commercially and can be used in the present system as described below.

Part B: Liquid Polymer

Part B, i.e., the liquid polymer system can comprise different polyurethanes, acrylics, Kraton, styrene butadiene, silicone polymers or any combinations thereof.

In Examples 1-4 below, the polyurethane polymer composition was made by reacting polyol and MDI in the presence of a tin catalyst to achieve a % NCO of 2.6 and a viscosity of 14,000 cps at 25° C. with spindle 52 at 20 rpm using a cone and plate viscometer.

Example 1

In this example, 1 part of Part B, a polyurethane polymer, was mixed with 10 parts of Part A, a rubberized asphalt emulsion, and a 125 mm coating of the mixture applied to a substrate. The amounts are listed in Table 1 a and 1 b below.

TABLE 1a

Part A

| Composition | Parts Latex per 100 Parts |
|---|---|
| Asphalt Latex (64% solids) | 76.5 |
| Styrene Butadiene Rubber Latex (68% solids) | 9.1 |
| Natural Rubber Latex (61.5% solids) | 14.4 |
| TOTAL | 100.00 |

TABLE 1b

Part B

| Composition | Weight Percent |
|---|---|
| Polyurethane Polymer | 100 |
| TOTAL | 100.00 |

The mixture of Parts A and B was compared to Part A in the following two ways, wash out resistance and 24 hour cure depth. The results are listed in Table 1c below.

TABLE 1c

| Composition | 16 hour cure through | Water wash out at 30 PSI |
|---|---|---|
| Parts A + B | 4 mm | Passed after 4 hours |
| Part A | 1 mm | Passed after 10 hours |

Example 2

In this example, 1 part of Part B, a polyurethane polymer, was mixed with 6 parts of Part A, a rubberized asphalt emulsion, and a 125 mm coating of the mixture applied to a substrate. The amounts are listed in Table 2a and 2b below.

TABLE 2a

Part A

| Composition | Parts Latex per 100 Parts |
|---|---|
| Asphalt Latex (64% solids) | 76.5 |
| Styrene Butadiene Rubber Latex (68% solids) | 9.1 |
| Natural Rubber Latex (61.5% solids) | 14.4 |
| TOTAL | 100.00 |

TABLE 2b

Part B

| Composition | Weight Percent |
|---|---|
| Polyurethane Polymer | 60 |
| Calcium Carbonate | 15 |
| Calcium Oxide | 7 |
| Plasticizer | 17 |
| Pigment Package | 1 |
| TOTAL | 100.00 |

The mixture of Parts A and B was compared to Part A in the following two ways, wash out resistance and 24 hour cure depth. The results are listed in Table 2c below.

TABLE 2c

| Composition | 16 hour cure through | Water wash out at 30 PSI |
|---|---|---|
| Parts A + B | 4 mm | Passed after 4 hours |
| Part A | 1 mm | Passes after 10 hours |

Example 3

In this example, 1 part of Part B, a polyurethane polymer, was mixed with 7 parts of Part A, a rubberized asphalt emulsion, and a 125 mm coating of the mixture applied to a substrate. The amounts are listed in Table 3a and 3b below.

TABLE 3a

Part A

| Composition | Parts Latex per 100 Parts |
|---|---|
| Asphalt Latex (64% solids) | 55.4 |
| Natural Rubber Latex (61.5% solids) | 44.6 |
| TOTAL | 100.00 |

TABLE 3b

Part B

| Composition | Weight Percent |
|---|---|
| Polyurethane Polymer | 60 |
| Calcium Carbonate | 15 |
| Calcium Oxide | 7 |
| Plasticizer | 17 |
| Pigment Package | 1 |
| TOTAL | 100.00 |

The mixture of Parts A and B was compared to Part A in the following two ways, wash out resistance and 24 hour cure depth. The results are listed in Table 3c below.

TABLE 3c

| Composition | 16 hour cure through | Water wash out at 30 PSI |
|---|---|---|
| Parts A + B | 5 mm | Passed after 3 hours |
| Part A | 3 mm | Passed after 6 hours |

Example 4

In this example, 1 part of Part B, a polyurethane polymer, was mixed with 7 parts of Part A, a rubberized asphalt emulsion, and a 125 mm coating of the mixture applied to a substrate. The amounts are listed in Table 4a and 4b below.

TABLE 4a

Part A

| Composition | Parts Latex per 100 Parts |
|---|---|
| Asphalt Latex (64% solids) | 86.3 |
| Styrene Butadiene Rubber Latex (68% solids) | 13.7 |
| TOTAL | 100.00 |

TABLE 4b

Part B

| Composition | Weight Percent |
|---|---|
| Polyurethane Polymer | 60 |
| Calcium Carbonate | 15 |
| Calcium Oxide | 7 |
| Plasticizer | 17 |
| Pigment Package | 1 |
| TOTAL | 100.00 |

The mixture of Parts A and B was compared to Part A in the following two ways, wash out resistance and 24 hour cure depth. The results are listed in Table 4c below.

TABLE 4c

| Composition | 16 hour cure through | Water wash out at 30 PSI |
|---|---|---|
| Parts A + B | 5 mm | Passed after 2 hours |
| Part A | 0 mm | Failed after 16 hours |

Example 5

In this example, 1 part of Part B, a silicone polymer, was mixed with 6 parts of Part A, a rubberized asphalt emulsion and a 125 mm coating of the mixture applied to a substrate. The amounts are listed in Table 5a and 5b below.

TABLE 5a

Part A

| Composition | Parts Latex per 100 Parts |
|---|---|
| Asphalt Latex (64% solids) | 76.5 |
| Styrene Butadiene Rubber Latex (68% solids) | 9.1 |
| Natural Rubber Latex (61.5% solids) | 14.4 |
| TOTAL | 100.00 |

TABLE 5b

Part b

| Composition | Parts Latex per 100 Parts |
|---|---|
| Silicone polymer | 69.64 |
| Plasticizer | 11.8 |
| Fumed Silica | 10.5 |
| Crosslinker | 5.4 |
| Adhesion promoter | 2.64 |
| Catalyst | .02 |
| TOTAL | 100.00 |

The mixture of Parts A and B was compared to Part A in the following two ways, wash out resistance and 24 hour cure depth. The results are listed in Table 5c below.

TABLE 5c

| Composition | 16 hour cure through | Water wash out at 30 PSI |
|---|---|---|
| Parts A + B | 5 mm | Passed after 4 hours |
| Part A | 1 mm | Passed after 10 hours |

Example 6

In this example, 1 part of Part B, a acrylic polymer, was mixed with 6 parts of Part A, a rubberized asphalt emulsion and a 125 mm coating of the mixture applied to a substrate. The amounts are listed in Table 6a and 6b below.

TABLE 6a

Part A

| Composition | Parts Latex per 100 Parts |
|---|---|
| Asphalt Latex (64% solids) | 76.5 |
| Styrene Butadiene Rubber Latex (68% solids) | 9.1 |
| Natural Rubber Latex (61.5% solids) | 14.4 |
| TOTAL | 100.00 |

TABLE 6b

Part B

| Composition | Parts Latex per 100 Parts |
|---|---|
| Calcium carbonate | 34 |
| Ethylacrylate-acrylonitrile-acrylic acid terpolymer | 33 |
| Xylene | 11.5 |
| Talc | 5.2 |
| ceramic fibers | 4.2 |
| Oxydipropyl dibenzoate | 4 |

TABLE 6b-continued

Part B

| Composition | Parts Latex per 100 Parts |
|---|---|
| Ethylbenzene | 2.5 |
| Amorphous silica | 2 |
| Titanium dioxide | 1.2 |
| Nonylphenol branched polyurethane | 1 |
| Hydrogenated castor oil | 1 |
| Titanium dioxide | 1.2 |
| Dolomite | .4 |
| TOTAL | 100.00 |

The mixture of Parts A and B was compared to Part A in the following two ways, wash out resistance and 24 hour cure depth. The results are listed in Table 6c below.

TABLE 6c

| Composition | 16 hour cure through | Water wash out at 30 PSI |
|---|---|---|
| Parts A + B | 3 mm | Passed after 6 hours |
| Part A | 1 mm | Passes after 10 hours |

Example 7

In this example, 1 part of Part B, a SEBS blocked co-polymer, was mixed with 6 parts of Part A, a rubberized asphalt emulsion and a 125 mm coating of the mixture applied to a substrate. The amounts are listed in Table 7a and 7b below.

TABLE 7a

Part A

| Composition | Parts Latex per 100 Parts |
|---|---|
| Asphalt Latex (64% solids) | 76.5 |
| Styrene Butadiene Rubber Latex (68% solids) | 9.1 |
| Natural Rubber Latex (61.5% solids) | 14.4 |
| TOTAL | 100.00 |

TABLE 7b

Part B

| Composition | Weight Percent |
|---|---|
| Xylene | 25.5 |
| Hydrogenated hydrocarbons | 14 |
| Styrene-(ethylene-butylene)-styren block polymer | 13.5 |
| Aluminum silicates | 8.3 |
| Polybutene | 8.2 |
| Titanium dioxide | 8 |
| Aromatic hydrocarbon resin | 7.4 |
| Ethylbenzene | 6.1 |
| Styrene-isoprene rubber | 5.3 |
| Hydrocarbon resin | 3.3 |
| (3-Mercaptopropyl) trimethoxysilane | .4 |
| TOTAL | 100.00 |

The mixture of Parts A and B was compared to Part A in the following two ways, wash out resistance and 24 hour cure depth. The results are listed in Table 3c below.

TABLE 7c

| Composition | 16 hour cure through | Water wash out at 30 PSI |
|---|---|---|
| Parts A + B | 3 mm | Passed after 6 hours |
| Part A | 1 mm | Passed after 10 hours |

What is claimed is:

1. A multipart system for preparing a coating composition in situ, the system comprising:
   a) an emulsion comprising asphalt, water, and a dispersion system; and
   b) a liquid polymer composition that lacks water;
wherein the asphalt emulsion and the liquid polymer composition are present in the multipart system at a ratio of 3:1 or greater.

2. The multipart system of claim 1, wherein the asphalt emulsion and the liquid polymer composition are present in the system at a ratio of 17:1 to 3:1.

3. The multipart system of claim 1, wherein the asphalt emulsion further comprises one or more of the following emulsions: natural rubber, styrene butadiene rubber, an acrylic resin, and a polyvinyl acetate, or any combination thereof.

4. The multipart system of claim 1, wherein the solids content of the asphalt emulsion is from 35 to 65% by weight.

5. The multipart system of claim 1, wherein the liquid polymer is chosen from one or more of the following: a polyurethane, an acrylic polymer, styrene butadiene, a styrene-containing block polymer, a silicone polymer, or any combinations thereof.

6. The multipart system of claim 1, wherein the liquid polymer lacks a solvent.

7. The multipart system of claim 1, wherein the liquid polymer composition comprises a solvent.

8. The multipart system of claim 1, wherein the liquid polymer composition comprises calcium oxide, calcium carbonate, a plasticizer, or any combination thereof.

9. The multipart system of claim 1, wherein the liquid polymer composition comprises a polyurethane.

10. The multipart system of claim 1, wherein the liquid polymer composition comprises an acrylic polymer.

11. The multipart system of claim 1, wherein the liquid polymer composition comprises a silicone polymer.

12. The multipart system of claim 1, wherein the liquid polymer composition comprises a styrene block polymer.

13. The multipart system of claim 1, wherein the liquid polymer composition comprises styrene butadiene.

14. The multipart system of claim 1, further comprising a catalyst, wherein said catalyst is a separate part of the system or is included in the asphalt emulsion.

15. A method of coating a substrate comprising:
   a) preparing a coating composition in situ,
      wherein the coating composition is prepared by combining an emulsion comprising asphalt, water, and a dispersion system with a liquid polymer composition, wherein said liquid polymer composition lacks water and comprises a polyurethane, an acrylic polymer, styrene butadiene, a silicone polymer, a sytrene-containing block polymer, or any combination of said polymers, and,
      wherein the asphalt emulsion and liquid polymer composition are combined at a ratio of 3:1 or greater; and
   b) applying the coating composition to the substrate.

16. The method of claim 15, wherein the method is performed without heating the coating composition.

17. The method of claim 15, wherein one or more layers of the coating composition are applied to the substrate, and wherein at least one of said one or more layers is 250 millimeters or more in thickness.

18. The method of claim 15, wherein a curing catalyst is incorporated into the coating composition prior to application of the coating composition to the substrate.

19. The method of claim 18, wherein the curing catalyst is a tin catalyst.

20. The method of claim 15, wherein the ratio of asphalt emulsion to liquid polymer composition ranges from 17:1 to 3:1.

21. A method of increasing the cure-through rate of a coating comprising an asphalt emulsion, comprising:
  (a) providing an asphalt emulsion comprising asphalt, water, and a dispersion system,
  (b) combining the asphalt emulsion of step a with a liquid polymer composition that lacks water to provide a coating composition, wherein the ratio of asphalt emulsion to liquid polymer composition is 3:1 or greater,
  (c) applying the coating composition of step b to a substrate;

wherein the cure-through rate of a coating formed from the coating composition of step b is faster than the cure through rate of a coating formed from the asphalt emulsion alone.

22. A method of preparing a weather-resistant, single-layer coating, having a thickness of 250 millimeters or greater, comprising
  a) combining in situ an asphalt emulsion comprising water, asphalt, and a dispersion system with a non-emulsion, liquid polymer composition to provide a coating composition, wherein said non-emulsion liquid polymer composition lacks water and comprises a polyurethane, an acrylic polymer, styrene butadiene, a silicone polymer, a sytrene block polymer, or any combination of said polymers, and
  wherein the ratio of asphalt emulsion to the non-emulsion polyurethane polymer composition is from 17:1 to 3:1; and
  b) applying at least one layer of the coating composition to a substrate, wherein the at least one layer has a thick of 250 millimeters or greater.

* * * * *